L. W. AVANT.
PROCESS FOR EXTRACTING HONEY.
APPLICATION FILED FEB. 28, 1908.

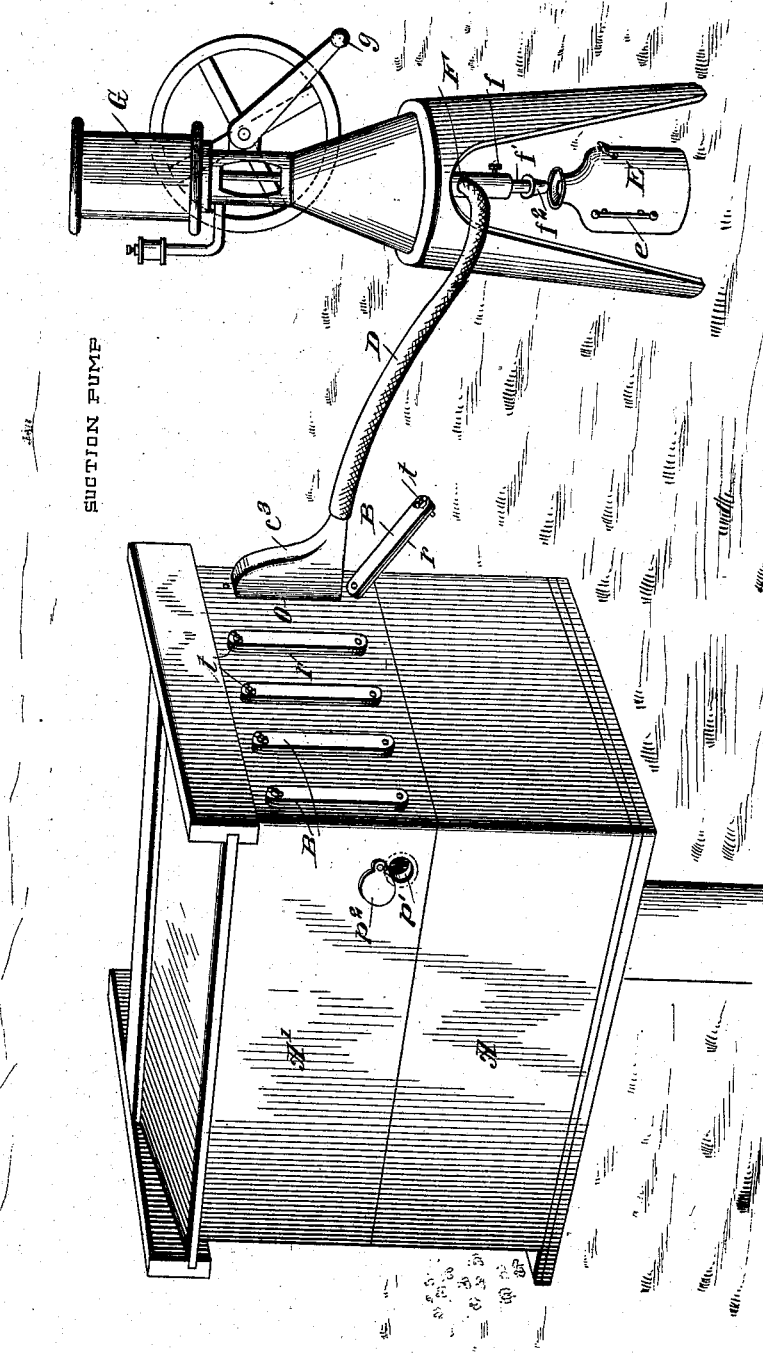

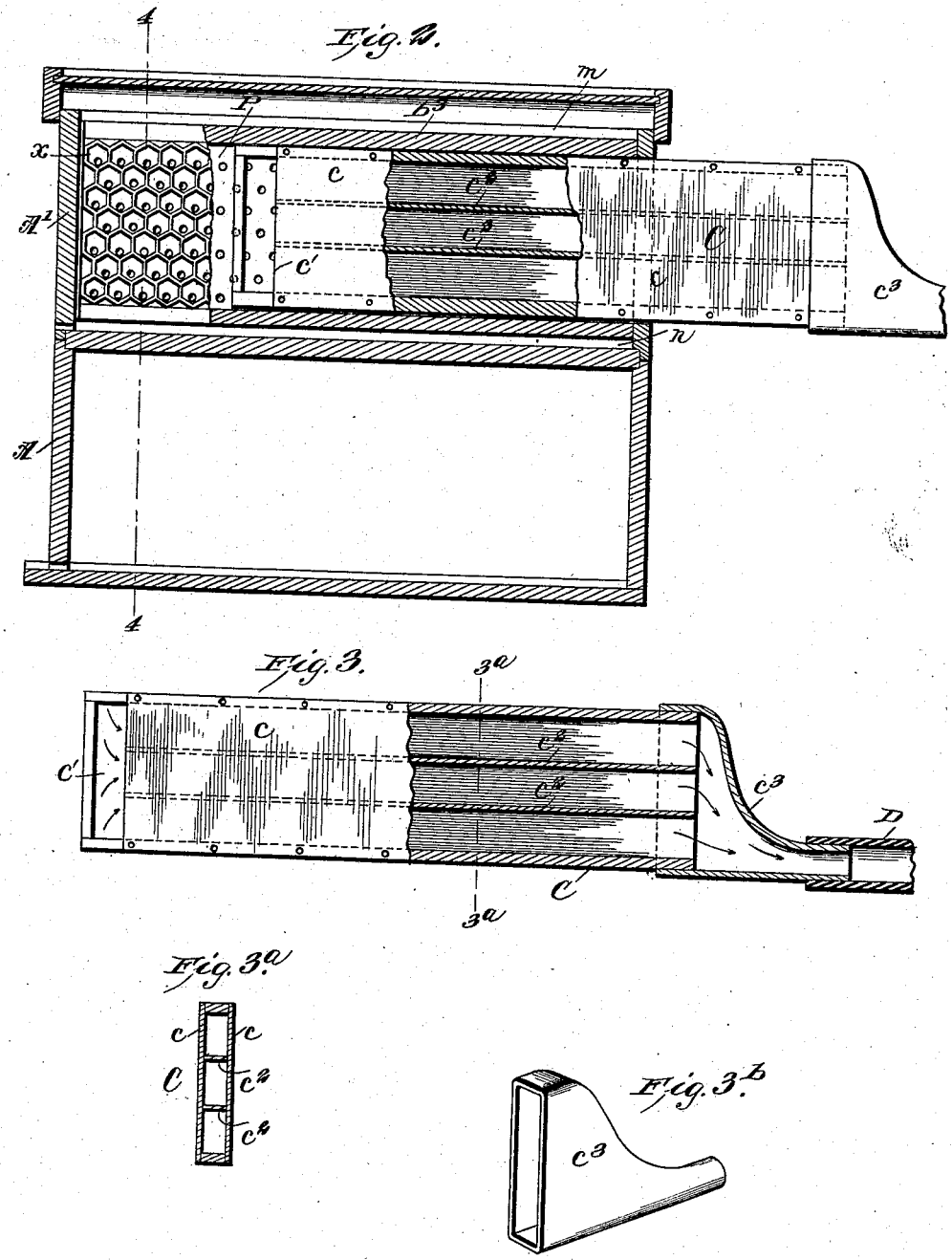

900,643.

Patented Oct. 6, 1908.

3 SHEETS—SHEET 3.

Witnesses
E. M. Callaghan
Edw. W. Byrn

Inventor
LEONIDAS W. AVANT
Attorneys Munn & Co.

UNITED STATES PATENT OFFICE.

LEONIDAS W. AVANT, OF ATASCOSA, TEXAS.

PROCESS FOR EXTRACTING HONEY.

No. 900,643.　　　Specification of Letters Patent.　　　Patented Oct. 6, 1908.

Application filed February 28, 1908. Serial No. 418,281.

*To all whom it may concern:*

Be it known that I, LEONIDAS W. AVANT, a citizen of the United States, and a resident of Atascosa, in the county of Bexar and State of Texas, have made certain new and useful Improvements in Processes for Extracting Honey, of which the following is a specification.

My invention is in the nature of a novel process for extracting honey from bee hives without opening the hive and without materially disturbing the bees and also without robbing the hive of the wax of which the cells are made. It is well known that a large part of the time and work of the bees is devoted to the gathering of the material for wax and the building of the cells prior to filling the same with honey. Any means therefore which will relieve the bees of the labor of gathering the wax and building the cells economizes their time and allows them to devote their undivided energy to the gathering of the honey and storing the same in the cells.

Figure 4:
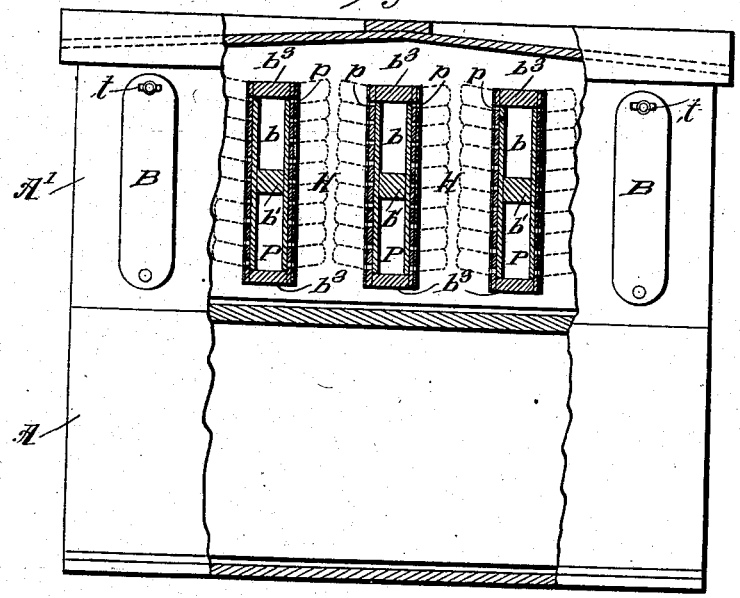
Figure 5:
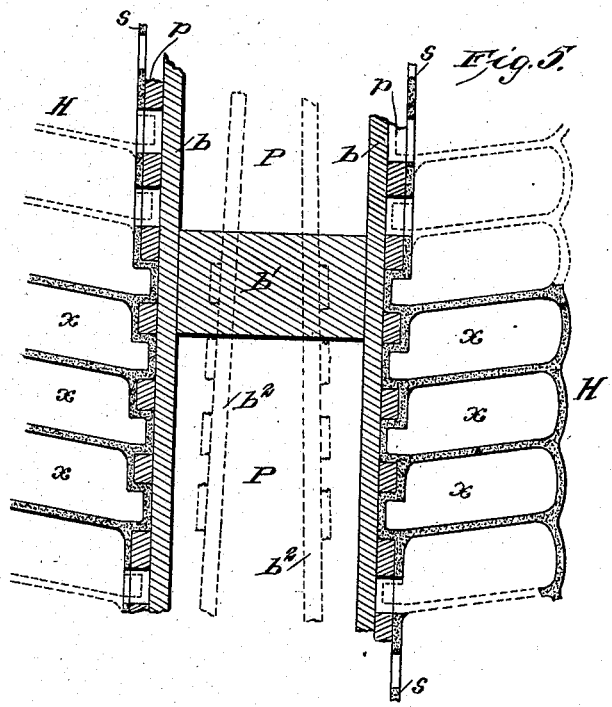

In the drawing—Figure 1 is a perspective view of an improved hive and apparatus used in conjunction therewith for permitting the extraction of the honey by my process. Fig. 2 is a vertical longitudinal section through the hive with the suction box applied thereto. Fig. 3 is a sectional side view of the suction box. Fig. $3^a$ is a cross section of the same on the line $3^a$—$3^a$. Fig. $3^b$ is a perspective detail of the end coupling for the same. Fig. 4 is a partial vertical transverse section through the honey compartments and hollow partitions, and Fig. 5 is a similar view on an enlarged scale showing the method of building the honey cells and of opening the ends of the same preparatory to the extraction of the honey therefrom without disturbing the position of the cells themselves.

Referring to Fig. 1, A, $A^1$ represents a two-story hive made in accordance with my invention as herein more fully described in detail.

D is a suction hose connected to the suction pipe F of a suction pump G, which may be actuated either by hand through a crank handle $g$ or by any suitable power. This suction pump G is only shown as one type of any form of suction apparatus which may be used and which may be replaced by any other known form of suction apparatus. The lower end of the suction pipe F of the suction pump is provided with a telescoping section $f'$ having at its lower end a hollow plug $f^2$ adapted to fit into the mouth of a can E of suitable capacity to receive the extracted honey. The telescoping section $f'$ of the suction pipe is made vertically adjustable and is maintained in position by a set screw $f$ so that it may be raised to remove the subjacent honey receiver E, or may be adjusted down to communicate with the mouth of the same. On the side of the honey receiver E is arranged a glass gage $e$ adapted to indicate the level of the honey in the receiver when the same is approximately filled.

At the inlet end of the hose D, see Figs. 2 and 3, there is fitted a coupling $c^3$ having a vertically enlarged end which connects with an elongated suction box C. This box is formed as an inclosed frame having side pieces $c$, $c$, which do not extend quite to the extreme end of the box but leave open spaces $c'$ on each side at said end. There are also arranged within this box horizontal parallel partitions $c^2$, $c^2$, extending from the open end $c'$ of the box to the opposite end of the same. This suction box is made of vertical and horizontal dimensions in cross section adapted to enter any one of a series of hollow partitions extending through the bee hive and adapted to extract through the walls of said hollow partitions the honey from the cells in the intermediate honey compartments.

The lower story A of the hive is made in the usual way and receives the usual honey frames and is employed mainly for the brooder comb. The upper story A', however, is formed with openings O at the opposite end from the lighting-board of the hive and these openings O are made of vertical and horizontal dimensions to exactly correspond to and fit with the cross section of the suction box C, shown in Fig. 3, and to form a close fit therewith when the latter is inserted into any opening O. These openings O are normally closed by means of elongated vertical cover strips B pivoted at their lower ends and provided at their upper ends with thumb screws $t$ adapted to enter corresponding holes at the upper ends of said opening and said cover strips are provided on their inner faces with soft rubber gaskets $r$ which cause said doors to have an air-tight fit against the end of the hive when said cover strips are turned over said openings and secured in place thereagainst by the thumb screws $t$.

In order to adapt the hive to coöperation with the suction box C, the internal construction of the upper story $A^1$ of the hive is made in a peculiar way, as shown in Figs. 2, 4 and 5. Each super story of the hive is formed with a series of hollow partitions P, the vertical spaces in which partitions correspond to and are in alinement with the openings O in the end of the hive. Said hollow partitions are formed of two parallel vertical perforated plates $p$, $p$, rigidly connected at the top and bottom by means of the strips $b^3$, $b^3$ and having angular flanges on their vertical edges which are nailed to the sides of the hive body. These perforated partitions form the socket chambers into which the suction box C is inserted for extracting the honey. Between the hollow partitions P are formed the honey compartments H in which the bees build their wax cells and store their honey. Some of these cells are shown at $x$, $x$, in Fig. 5, and extend from the hollow partition on one side about half way to the hollow partition on the other side. As the wax cells are always closed hermetically by the bees, some means must be provided whereby these cells are opened in order to permit the suction effect to extract the fluid honey therefrom. To provide for this I place within the hollow partitions two vertical imperforate plates $b$, $b$, which are fitted closely to the sides of the perforated stationary partitions $p$ $p$ and are maintained in close juxtaposition thereto by means of detachable spacing strips $b'$. When the two imperforate plates $b$ $b$ are in position against the perforated walls $p$ and the spacing strips $b'$ are in position, it will be seen that the perforations in the plates $p$ are closed and this is the normal position of parts when the hive is set up for the work of the bees and the reception of the honey, the hollow partitions being of course closed by means of the external cover strips B. When the hive is thus set up and submitted to the work of the bees, the first work of the bees would be to build the wax cells $x$ as shown in Fig. 5. In doing this they first fill the perforations in the plates $p$ with wax, forming the ends of the cells and these ends of the cells are cemented to the exposed faces of the detachable imperforate plates $b$. The bees then complete the body of the cells and fill the same with honey according to their well known instinct.

Now, assuming that the honey compartments H have been filled with cells $x$ and the cells loaded with their charge of honey, when it is desired to remove the same, one of the cover strips B on the outside of the hive is turned down as shown on the right of Fig. 1, which exposes the end of the removable spacing strip $b'$, seen in Fig. 4. This strip $b'$ is slipped out longitudinally through the opening O and then by means of a knife or chisel, the imperforate plates $b$, $b$, seen in Fig. 5, are pressed inwardly into the hollow compartment and away from the honey cells, as seen in dotted lines at $b^2$, $b^2$. Both plates $b$, $b$ are then taken out together by a pair of pincers. As the ends of the honey cells have been cemented to each plate $b$, it will be seen that when such plate is forcibly pressed away from the perforated walls $p$, as shown by the dotted position $b^2$, this plate will, by the adhesion of the wax, rupture the end of each cell, and therefore open the same. Into the space of this hollow partition which now extends from the perforated plate $p$ on one side to $p$ on the other, there is inserted a suction box C as shown in Fig. 2, and this suction box is slowly moved from one end of the hive to the other as it is gradually inserted into the same with the result that the suction within this box is now felt through the open sides $c'$ of the same and exerts its suction effect upon the fluid contents of each one of the honey cells $x$, $x$.

When the suction box C is inserted into the hollow partition the honey gathered at the open end of the same will be distributed upon the bottom of the suction box and also upon the horizontal partitions $c^2$ within the same, thus preventing any clogging within the hive. After the suction box has been thus slowly forced into the hollow partition through the full depth of the hive, it is withdrawn, the plates $b$ are inserted and readjusted, the opening at the end of the hollow partition closed and the next honey chamber is treated in the same way.

By means of this construction of hive and this process of extraction, it will be seen that the work of building the cells $x$ for the next storage of honey is entirely saved to the bees, thus securing a great economy of their labors, while the honey itself is extracted from the hive in a rapid, cleanly and expeditious manner without irritating or disturbing the bees to any considerable extent and the work of the apiarist is very greatly reduced and facilitated.

To facilitate the work of the original building of the cells I prefer to form the inner walls of each of the perforated plates $p$, with a layer of starter comb $s$, as seen in Fig. 5. This is done by dipping these plates in hot wax, which leaves a deposit of wax on one side. The plate is then passed through a machine which perforates the plate and wax and embosses the latter to form starters.

In constructing the super stories of the bee hive the series of honey chambers and alternating hollow partitions do not extend quite to either the top or bottom of the casing, but leave shallow spaces $m$ and $n$ as shown in Fig. 2, which permit the bees to freely pass to all of the honey compartments of the hive. Between the lower brooder story A and the upper super stories $A'$ there is to be placed a suitable queen excluder.

It will be understood that the upper stories or supers A' as constructed in accordance with my invention, are applicable to, and designed to be used with, any of the standard makes of hives already in use.

In my supers A', as thus described, I arrange at each of the two diagonally opposite corners peep holes which enable the apiarist to know when the super is ripe for robbing. One of these holes is shown at $p'$ in Fig. 1. On the inside of the casing the hole is provided with a glass covering, and on the outside a round closure cap $p^2$ is pivoted to the case so as to be turned over the hole or be turned away from the same for inspection. When the apiarist finds the honey finished at these points he knows that the super is ripe for robbing without having to open the hive.

With respect to the construction of hive and apparatus shown in connection therewith, I would state, that I make no claim to the same herein, as the mechanical features are made the subject matter of a separate application for a patent, filed by me January 14, 1908, Serial No. 410,781. I would have it understood, however, that while I prefer such construction in carrying out my process, I do not confine my present invention to that apparatus, as my process may be carried out in other ways, as for example my method of simultaneously rupturing the ends of the honey cells by pulling the wax away from the same, may be employed as a feature in connection with any form of hive, or any mode of extraction.

I claim:—

1. The process of extracting honey from honey comb which consists in simultaneously pulling out the wax from the ends of the cells to open the latter and then extracting the fluid contents.

2. The process of extracting honey from honey comb which consists in simultaneously pulling out the wax from the ends of the cells to open the latter and then extracting the fluid contents by suction.

3. The process of extracting honey from honey comb which consists in simultaneously pulling out the wax from the ends of the cells to open the latter and then extracting the fluid contents by atmospheric pressure.

4. The process of extracting honey from bee hives, which consists in rupturing the ends of the cells within the hive and removing the honey therefrom by atmospheric pressure.

5. The process of extracting honey from bee hives, which consists in rupturing the ends of the cells within the hive and applying to one end of each cell a suction for removing the contents of the same.

LEONIDAS W. AVANT.

Witnesses:
 ED. HENEFIELD,
 JOHN KINNEY.